United States Patent
Anand et al.

(10) Patent No.: US 12,242,363 B2
(45) Date of Patent: Mar. 4, 2025

(54) SYSTEM AND METHOD FOR SECURING RESOLUTION OF A SYSTEM ALARM

(71) Applicant: Bank of America Corporation, Charlotte, NC (US)

(72) Inventors: Vasuki Anand, Chennai (IN); Rajesh Agarwal, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 8 days.

(21) Appl. No.: 18/351,395

(22) Filed: Jul. 12, 2023

(65) Prior Publication Data

US 2025/0021456 A1      Jan. 16, 2025

(51) Int. Cl.
*G06F 11/30* (2006.01)

(52) U.S. Cl.
CPC ................................. *G06F 11/302* (2013.01)

(58) Field of Classification Search
CPC ........................... G06F 11/302; G06F 11/0766
USPC ............................................... 714/37, 48, 57
See application file for complete search history.

(56) References Cited

U.S. PATENT DOCUMENTS

| | | |
|---|---|---|
| 5,559,933 A | 9/1996 | Boswell |
| 6,064,821 A | 5/2000 | Shough et al. |
| 6,976,072 B2 | 12/2005 | Mathieson |
| 7,107,283 B2 | 9/2006 | Seifi |
| 7,634,559 B2 | 12/2009 | Brown |
| 7,886,296 B2 | 2/2011 | Ly et al. |
| 7,996,850 B2 | 8/2011 | Massmann et al. |
| 8,427,667 B2 | 4/2013 | Ly et al. |
| 8,464,262 B2 | 6/2013 | Ly et al. |
| 8,495,639 B2 | 7/2013 | Ly et al. |
| 8,572,616 B2 | 10/2013 | Cai et al. |
| 9,032,091 B2 | 5/2015 | Jobanputra et al. |
| 9,405,582 B2 | 8/2016 | Fuller et al. |
| 9,582,781 B1 | 2/2017 | Kearns et al. |
| 9,600,216 B2 | 3/2017 | Ly et al. |
| 9,612,878 B2 | 4/2017 | Balsamo et al. |
| 9,678,793 B2 | 6/2017 | Kumar et al. |
| 9,740,522 B2 | 8/2017 | Schmidt et al. |
| 9,811,795 B1 | 11/2017 | Kearns et al. |
| 9,852,302 B2 * | 12/2017 | Dv ........................... G06F 21/45 |
| 9,867,051 B2 * | 1/2018 | Park ....................... H04W 12/10 |
| 10,983,824 B2 | 4/2021 | Aggarwal |
| 2012/0137309 A1 | 5/2012 | Makam et al. |

(Continued)

FOREIGN PATENT DOCUMENTS

| | | | | |
|---|---|---|---|---|
| CA | 2474879 C | * | 4/2013 | ............... G06F 9/46 |
| DE | 112020000694 T5 | | 10/2021 | |

(Continued)

OTHER PUBLICATIONS

Anand, Vasuki, A system and method for resolving a system alarm, U.S. Appl. No. 18/351,333, filed Jul. 12, 2023.

*Primary Examiner* — Chae M Ko

(57) ABSTRACT

A system includes a memory and a processor configured to detect that a first alarm associated with a first software application has been triggered and perform a plurality of operations to resolve the first alarm. The processor accesses a plurality of rules from the memory and applies the plurality of rules to performing the plurality of operations to implement one or more of data security, data privacy and responsiveness associated with the resolution of the first alarm.

20 Claims, 3 Drawing Sheets

(56) References Cited

U.S. PATENT DOCUMENTS

| | | | |
|---|---|---|---|
| 2014/0201747 A1 | 7/2014 | Pattnaik et al. | |
| 2020/0012548 A1* | 1/2020 | Escutia Garcia | ... G06F 11/3409 |
| 2023/0114650 A1* | 4/2023 | Keith, Jr. | ............. G06F 21/316 |
| | | | 726/7 |

FOREIGN PATENT DOCUMENTS

| | | | | |
|---|---|---|---|---|
| JP | 4995980 | B2 | 8/2012 | |
| JP | 5249372 | B2 | 7/2013 | |
| WO | WO-2014169631 A1 * | | 10/2014 | ............. G06F 21/00 |

* cited by examiner

SYSTEM AND METHOD FOR SECURING RESOLUTION OF A SYSTEM ALARM

TECHNICAL FIELD

The present disclosure relates generally to data processing, and more specifically to a system and method for securing resolution of a system alarm.

BACKGROUND

Software applications often malfunction or fail because of errors and/or exceptions associated with the software applications. Errors that may cause a software application to fail include, but are not limited to, logical design errors, software coding errors, user interface errors, changing requirements, inaccurate estimates of needed resources, badly defined system requirements, lack of resources, and use of immature technology. When a software application experiences an error, an alarm is typically raised to inform a software support team that the error has occurred. The software support team may then manually investigate what caused the error and then may provide a resolution to resolve the error. However, this process of investigating and resolving system alarms is inefficient, time consuming, error prone, and often leads to prolonged downtime related to systems associated with the malfunctioning software application leading to service interruption, user dissatisfaction and lost revenues.

SUMMARY

The system and method implemented by the system as disclosed in the present disclosure provide technical solutions to the technical problems discussed above by providing intelligent and swift resolution to alarms associated with software applications.

For example, the disclosed system and methods provide the practical application of resolving an alarm associated with a software application intelligently and quickly. As described in embodiments of the present disclosure, in response to detecting that an alarm associated with a particular software application has been triggered, an alarms manager is configured to determine a root cause associated with the alarm, wherein the root cause is responsible for causing one or more errors associated with the particular software application resulting in a malfunction or failure of the particular software application. Once the root cause has been identified, alarms manager searches a plurality of data containers for a same or similar root cause that was previously resolved. Each of the plurality of data containers stores data associated with resolution of an alarm that was previously resolved and includes one or more root causes associated with the previously resolved alarm and a resolution method that was applied to resolve each root cause. Upon identifying a matching root cause in a particular data container, alarms manager identifies from the particular data container a resolution method mapped to the identified root cause that was previously implemented to resolve the root cause. Alarms manager implements the identified resolution method to resolve the root cause and the associated alarm.

By investigating and resolving an alarm associated with a particular software application intelligently and quickly, the disclosed system and method help quickly resolve the malfunctioning software application. Thus, the disclosed system and method improve the performance of a computing node running the software application and other computing systems that rely on the performance of the software application.

The disclosed system and methods provide an additional practical application of investigating and resolving an alarm associated with a software application securely and responsively. As described in embodiments of the present disclosure, alarms manager stores a plurality of rules defining one or more of data security, data privacy and responsiveness to be followed and applied while investigating and resolving an alarm. alarms manager monitors the end-to-end resolution process associated with a new alarm and applies the rules to implement one or more of the data security, the data privacy and the responsiveness of the resolution process. For example, alarms manager applies a first set of the rules to validate the authenticity of a newly triggered alarm and allows the resolution process to proceed further only upon determining that a source of the alarm is authentic. Alarms manager applies a second set of the rules to block access during the resolution process to data stored in the data containers that does not relate to the alarm. Alarms manager applies a third set of rules to protect sensitive data stored in the data containers by identifying and masking the sensitive data while the resolution process is in progress. Thus the disclosed system and method improve data privacy and data security in computing networks.

As described in embodiments of the present disclosure, alarms manager applies a fourth set of rules to determine and improve responsiveness associated with resolution of alarms. Alarms manager records an event log of the resolution process that includes information related to all operations performed during the resolution process associated with an alarm. Alarms manager analyses the information associated with one or more of the operations recorded in the event log and determines responsiveness relating to resolving the alarm based on the analysis. This allows the alarms manager to track the responsiveness of each operation of the resolution process as well as the overall responsiveness of the resolution process. Alarms manager generates a responsiveness report including the findings from the analysis described above, which is used to adjust the resolution process to improve responsiveness. By tracking and improving responsiveness of resolution processes associated with alarms, the present system and method improves performance of computing systems and networks.

Thus, the disclosed system and method generally improve the technology associated with computing systems and networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
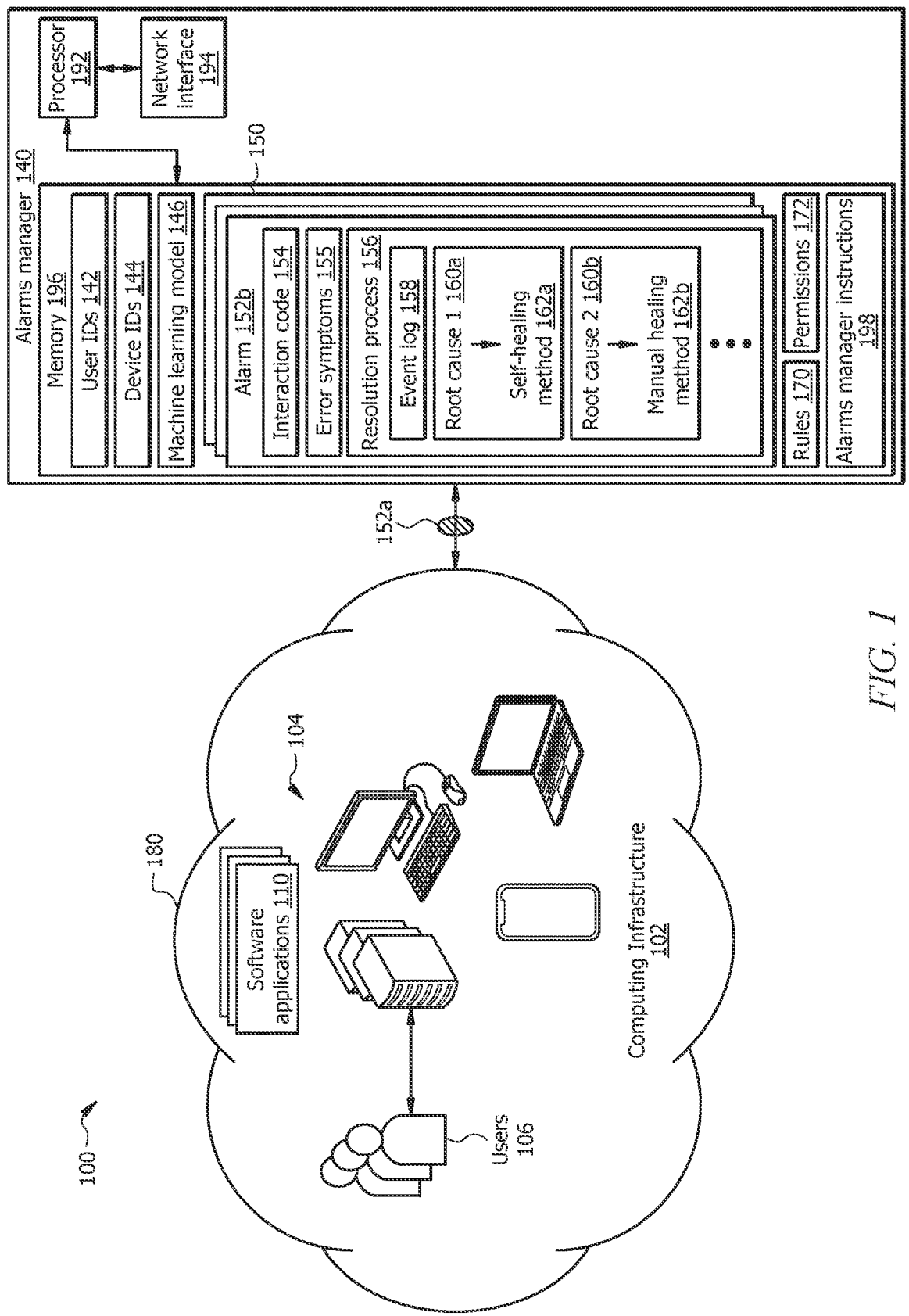
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 180. Software components may include software applications 110 that are run by one or more of the computing nodes 104 including, but not limited to, operating systems, user interface applications, web applications, third party software, database management software, service management software, metaverse software and other customized software programs implementing particular functionalities. For example, software code relating to one or more software applications 110 may be stored in a memory device and one or more processors may process the software code to implement respective functionalities.

One or more of the computing nodes 104 may be operated by a user 106. For example, a computing node 104 may provide a user interface using which a user 106 may operate the computing node 104 to perform data interactions within the computing infrastructure 102. For example, a user 106 may use a laptop computer to access a web application running on a server, wherein both the laptop computer and the server are part of the computing infrastructure 102.

In one embodiment, at least a first portion of the computing infrastructure 102 may be representative of an Information Technology (IT) infrastructure of an organization. For example, a first portion of the computing nodes 104 and a first portion of the software applications 110 may be part of the IT infrastructure of the organization. In this context, a second portion of the computing infrastructure 102, which is different from the first portion of the computing infrastructure 102, may not be a part of the IT infrastructure of the organization. For example, a second portion of the computing nodes 104 may not be part of the IT infrastructure of the organization and may be operated by users 106 to access software applications 110 running on computing nodes 104 that are part of the first portion of the computing nodes 104 belonging to the IT infrastructure of the organization. In one example scenario, the first portion of the computing infrastructure 102 may belong to a provider of a social media application/platform which provides access to the social media application/platform running on servers within the IT infrastructure belonging to the social media provider. Users of the social media platform may access the social media application running on the provider's servers using external computing nodes 104 that are not part of the IT infrastructure of the social media provider.

One or more computing nodes 104 of the computing infrastructure 102 may be representative of a computing system that hosts software applications which may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., alarms manager 140) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

The alarms manager 140 comprises a processor 192, a memory 196, and a network interface 194. The alarms manager 140 may be configured as shown in FIG. 1 or in any other suitable configuration.

The processor 192 comprises one or more processors operably coupled to the memory 196. The processor 192 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 192 may be a programmable logic device, a microcontroller, a microprocessor, or any suitable combination of the preceding. The processor 192 is communicatively coupled to and in signal communication with the memory 196. The one or more processors are configured to process data and may be implemented in hardware or software. For example, the processor 192 may be 8-bit, 16-bit, 32-bit, 64-bit or of any other suitable architecture. The processor 192 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., alarms manager instructions 198) to implement the alarms manager 140. In this way, processor 192 may be a special-purpose computer designed to implement the functions disclosed herein. In one or more embodiments, the alarms manager 140 is implemented using logic units, FPGAs, ASICs, DSPs, or any other suitable hardware. The alarms manager 140 is configured to operate as described with reference to FIGS. 2 and 3. For example, the processor 192 may be configured to perform at least a portion of the method 200 as described in FIG. 2 and method 300 described in FIG. 3.

The memory 196 comprises one or more disks, tape drives, or solid-state drives, and may be used as an over-flow data storage device, to store programs when such programs are selected for execution, and to store instructions and data that are read during program execution. The memory 196 may be volatile or non-volatile and may comprise a read-only memory (ROM), random-access memory (RAM), ternary content-addressable memory (TCAM), dynamic random-access memory (DRAM), and static random-access memory (SRAM).

The memory 196 is operable to store user IDs 142, device IDs 144, machine learning model 146, data containers 150, and the alarms manager instructions 198. The alarm manager instructions 198 may include any suitable set of instructions, logic, rules, or code operable to execute the alarm manager 140.

The network interface 194 is configured to enable wired and/or wireless communications. The network interface 194 is configured to communicate data between the alarms manager 140 and other devices, systems, or domains (e.g., computing nodes 104 etc.). For example, the network interface 194 may comprise a Wi-Fi interface, a LAN interface, a WAN interface, a modem, a switch, or a router. The processor 192 is configured to send and receive data using the network interface 194. The network interface 194 may be configured to use any suitable type of communication protocol as would be appreciated by one of ordinary skill in the art.

It may be noted that each of the computing nodes 104 may be implemented like the alarms manager 140 shown in FIG. 1. For example, each of the computing nodes 104 may have a respective processor and a memory that stores data and instructions to perform operations discussed above Software applications often malfunction or fail because of errors and/or exceptions associated with the software application. Errors that may cause a software application 110 to fail include, but are not limited to, logical design errors, software coding errors, user interface errors, changing requirements, inaccurate estimates of needed resources, badly defined system requirements, lack of resources, and use of immature technology. When a software application 110 experiences an error an alarm 152 is typically raised to inform a software support team that the error has occurred. The software support team may then manually investigate what caused the error and then may provide a resolution to resolve the error. However, this process of investigating and resolving system alarms 152 is inefficient, time consuming and error prone and often leads to prolonged downtime related to systems associated with the malfunctioning software application 110 leading to service interruption, user dissatisfaction and lost revenues. Thus, there is a benefit to swiftly identifying root causes of software errors associated with system alarms and quickly resolving the errors, especially when the error is associated with critical system components. Additionally, the end-to-end lifecycle associated with investigating and resolving an alarm 152 typically involve several support team members and entities, which means that sensitive data related to the erroneous software application may be exposed to unintended and unauthorized entities which may lead to potential data security and privacy issues.

Embodiments of the present disclosure describe techniques to investigate and resolve alarms 152 associated with software applications 110 intelligently, securely and quickly.

In one or more embodiments, one or more computing nodes 104 of the computing infrastructure 102 may implement alarms manager 140 and respective operations performed by the alarms manager 140 described in embodiments of the present disclosure. As described in more detail below, alarms manager 140 may be configured to investigate and resolve alarms 152 associated with software applications 110 intelligently, securely and quickly.

Alarms manager 140 may be configured to receive alarms 152a from computing nodes 104 of the computing infrastructure 102, wherein an alarm 152 indicates an error associated with a software application 110. Alarms manager 140 may be configured to receive alarms 152a from internal systems that are part of an IT infrastructure (e.g., a first portion of the computing infrastructure 102) of an organization or external systems (e.g., a second portion of the computing infrastructure 102) that are not part of the IT infrastructure of the organization. For example, software applications 110 running on computing nodes 104 (e.g., servers) of the IT infrastructure of the organization may be used by internal systems and/or users of the organization as well as external systems and/or users that are not part of the organization. Thus, in one embodiment, when an internal system/user of the IT infrastructure experiences an error associated with a software application 110, the alarm 152a may be raised by the internal system/user. Additionally or alternatively, in one embodiment, when an external system/user that is not part of the IT infrastructure of the organization experiences an error associated with a software application 110 running on computing nodes 104 (e.g., servers) of the IT infrastructure, the alarm 152a may be raised by the external system/user. For example, an external user 106 may use an external computing node 104 (e.g., not part of the IT infrastructure) to access a web application running on a server that is part of the IT infrastructure. In this example, when the external user 106 experiences an error associated with the web application, the external user 106 may generate and alarm 152 and transmit the generated alarm 152 to the alarms manager 140. In one embodiment, the alarms manager 140 may be implemented by one or more computing nodes 104 of the portion of the computing infrastructure 102 that is part of the IT infrastructure of the organization.

Alarms manager may be configured to store a plurality of data containers 150 (e.g., 152a, 152b), wherein each data container 150 includes data associated with resolution of a particular alarm 152b that was previously received and resolved. The term "data container" in the context of the present disclosure refers to a container of data for a particular application (e.g., alarms manager 140). For example, each data container 150 may include a unique interaction code 154 that uniquely identifies a particular alarm 152 (e.g., a newly received alarm 152a or a previously resolved alarm 152b), error symptoms 155 associated with the particular alarm 152, and an associated resolution process 156. Error symptoms 155 may include errors (e.g., hung screen, user interface errors, logical errors etc.) encountered in a particular software application 110 that caused the particular alarm 152 to be triggered. In one embodiment, each of the plurality of data containers 150 is technology agnostic and is configured to be used on a plurality of technology platforms.

As shown in FIG. 1, the resolution process 156 associated with alarm 152b includes an event log 158 of all operations performed to investigate and resolve the particular alarm 152, one or more root causes 160 (e.g., shown as root causes 160a and 160b) associated with the particular alarm 152, and an error resolution method 162 (shown as self-healing method 162a and manual healing method 162b) corresponding to each root cause 160 that resolved the root cause 160. In this context, a root cause 160 is indicative of a particular error (e.g., software error or hardware error) which, at least in part, caused a software application 110 to malfunction or fail and let to the particular alarm 152 being raised. For example, a root causes 160 associated with the error symptom 155 of a hung UI screen may include faulty software code logic, insufficient allocation of memory resources, an older operating system or a combination thereof. A self-healing method 162a represents an error resolution method 162 that can be automatically applied to resolve the respective root cause 160a without human intervention. On the other hand, a manual healing method 162b represents an error resolution method 162 that needs human intervention for its application to resolve the respective root cause 160*b*. As further described below, alarms manager 140 may be configured to generate a new data container 150 in response to receiving an alarm 152*a* and may store data associated with the investigation and resolution of the alarm 152*a*.

In one or more embodiments, a new alarm 152*a* may be manually raised by a user 106 or automatically generated by a computing node 104. For example, a user 106, in response to experiencing a malfunction or failure associated with a software application, may manually generate an alarm 152*a* and transmit the alarm 152*a* to the alarms manager 140. The user 106 may generate and transmit the alarm 152*a* using one or more of several methods including, but not limited to, generating the alarm 152 using a customized application running on a computing node 104 registered with the alarms manager 140, emailing an indication of the alarm 152*a* to an email address designated for receiving alarms 152, transmitting a text message including an indication of the alarm 152*a* to a phone number designated for receiving alarms 152*a*, and placing a telephone call to a support team member to communicate the alarm 152*a*. In additional or alternative embodiments, a computing node 104 may be configured to automatically detect a malfunction and/or failure associated with a software application 110, generate an alarm 152*a* indicating the detecting malfunction and/or failure, and transmit the alarm 152*a* to a second computing node 104 configured to receive automatically generated alarms 152*a*.

In one or more embodiments, in response to detecting that an alarm 152*a* associated with a particular software application 110 has been triggered, alarms manager 140 may be configured to generate and assign an interaction code 154 that uniquely identifies the received alarm 152*a* and a corresponding resolution process 156 implemented by the alarms manager 140 to resolve the alarm 152*a*. Alarms manager 140 may generate a new data container 150 and may further map the generated interaction code 154 to the new data container 150. Alarms manager 140 may be configured to store information associated with the alarm 152*a* such as one or more error symptoms 155 associated with the particular software application 110. These error symptoms 155 may have been reported by a user 106 and/or an automated computing node 104 and may include errors (e.g., hung screen, user interface errors, logical errors etc.) encountered in the particular software application 110 that caused the alarm 152*a* to be triggered. As further described below, alarms manager 140 may be configured to store in the newly generated data container 150 associated with the alarm 152*a*, all operations associated with the resolution process 156 for investigating and resolving the alarm 152*a*.

Alarms manager 140 may be configured to perform a resolution process 156 to resolve the alarm 152*a* and fix one or more errors associated with the particular software application 110 that caused the alarm 152*a* to be triggered. The resolution process 156 may include the alarms manager 140 determining one or more root causes 160 associated with the alarm 152*a*, wherein each of the one or more determined root causes 160 may be responsible, at least in part, for causing the one or more errors associated with the software application 110 resulting in the malfunction or failure of the software application 110.

Alarms manager 140 may be configured to determine the one or more root causes 160 associated with the alarm 152 using one or more of several methods.

In a first example method, alarms manager 140 may be configured to search the data containers 150 for a previously resolved alarm 152*b* that is same as or similar to the newly received alarm 152*a*. For example, alarms manager 140 may search the data containers 150 for a previously resolved alarm 152 whose associated error symptoms 155 match the error symptoms 155 that were reported with the alarm 152*a*. For example, an error symptom 155 reported for the alarm 152*a* may include a hung screen associated with the particular software application 110. In this example, alarms manager 140 may search the data containers 150 for an alarm 152*b* that is also associated with the same error symptom 155 of a hung screen. In one embodiment, alarms manager 140 may search the data containers 150 for an alarm 152*b* that is also associated with the same error symptom 155 of a hung screen and also associated with the same particular software application 110 which is also associated with the newly received alarm 152*a*. Upon finding in a particular data container 150 a previously resolved alarm 152*b* that is associated with the same error symptom 155 of a hung screen, alarms manager 140 may be configured to determine that the identified previously resolved alarm 152*b* is same or similar to the newly received alarm 152*a*.

In response to determining, based on the search, a particular data container 150 associated with a previously resolved alarm 152*b* that is same or similar to the newly received alarm 152*a*, alarms manager 140 extracts from the identified particular data container 150 one or more root causes 160 associated with the previously resolved alarm 152*b* whose error symptoms 155 match with those of the newly received alarm 152*a*. Alarms manager 140 designates the extracted one or more root causes 160 as root causes 160 also associated with the newly received alarm 152*a*. In one embodiment, alarms manager 140 may be configured to determine that a previously resolved alarm 152*b* is same as the newly received alarm 152*a* when all error symptoms 155 associated with the previously resolved alarm 152*b* match the error symptoms 155 reported for the newly received alarm 152*a*. In an alternative or additional embodiment, alarms manager 140 may be configured to determine that a previously resolved alarm 152*b* is similar to the newly received alarm 152*a* when at least a pre-set threshold number of error symptoms 155 associated with the previously resolved alarm 152*b* match the corresponding error symptoms 155 reported for the newly received alarm 152*a*.

In one embodiment, alarms manager 140 may be configured to use a machine learning model 146 to search the data containers 150 for a previously resolved alarm 152*b* that is same as or similar to the newly received alarm 152*a* and extract one or more root causes 160 associated with the previously resolved alarm 152*b*. In this context, alarms manager 140 may be configured to train the machine learning model 146 based on data stored in the plurality of data containers 150.

In a second example method, alarms manager 140 may be configured to scan one or more software components (e.g., software applications 110) and/or one or more hardware components (e.g., computing nodes 104) associated with the new alarm 152*a* and the associated particular software application 110. Alarms manager 140 may determine one or more root causes associated with the new alarm 152*a* based on this scan. For example, alarms manager 140 may be configured to scan the particular software application 110, one or more upstream applications, one or more downstream applications, an operating system associated with the software application, and other supporting applications etc. associated with the new alarm 152*a*. Further, alarms manager 140 may be configured to scan systems and subsystems (e.g., hardware components such as one or more servers running these applications etc.) associated with the particular software application 110 to identify root causes 160 that caused the error symptoms 155 in the particular software application 110. For example, alarms manager 140 may be configured to scan/monitor a set of parameters indicating performance of the one or more software components (e.g., software applications 110) and/or one or more hardware components (e.g., computing nodes 104) associated with the new alarm 152a. When a particular parameter is found to be performing below an accepted (E.g., threshold) performance level, alarms manager 140 may be configured to determine malfunction of that particular parameter as a root cause 160 associated with the new alarm 152a.

In a third example method, upon receipt of the new alarm 152a, alarms manager 140 may be configured to automatically forward the new alarm 152a to a designated computing node 104 where an authorized support team member (e.g., one of users 106) may examine the new alarm 152 and the accompanying error symptoms 155 associated with the new alarm 152. The support team member may then manually investigate the alarm 152a and identify one or more root causes 160 associated with the new alarm 152a.

In certain embodiments, a combination of the above three methods for determining one or more root causes 160 may be performed. For example, alarms manager 140 may be configured to perform two or all three of the above described three methods to determine on or more root causes 160 associated with the new alarm 152a. In one embodiment, alarms manager 140 may forward the new alarm 152a to the support team member for manual identification of root causes 160 when either one or both of the first two methods described above fail to yield root causes 160 associated with the new alarm 152a.

Once one or more root causes 160 associated with the new alarm 152a have been determined, alarms manager 140 may be configured to search the data containers 150 for an error resolution method 162 corresponding to each of the determined one or more root causes 160. This search may include for each root cause 160 determined for the new alarm 152a, searching the data containers 150 for a same or similar root cause 160 that was previously resolved. As described above, each data container 150 stores the resolution process 156 associated with a previously resolved alarm 152b, including one or more root causes 160 (e.g., shown as root causes 160a and 160b) associated with the alarm 152b, and an error resolution method 162 (shown as self-healing method 162a and manual healing method 162b) corresponding to each root cause 160. Thus, in this context, for each root cause 160 determined for the new alarm 152a, alarms manager 140 may be configured to search the data containers 150 for a matching root cause 160 that was previously resolved. For example, a root cause 160 determined for the new alarm 152a with a reported error symptom 155 of a hung UI screen may include insufficient allocation of memory resources. In this example, alarms manager 140 may search the data containers 150 for a matching root cause 160 associated with a previously resolved alarm 152b that also corresponds to insufficient allocation of memory resources. Upon identifying a matching root cause 160 in a particular data container 150, alarms manager 140 may be configured to identify from the particular data container 150 a resolution method 162 mapped to the identified root cause 160 that was previously implemented to resolve the root cause 160. As described above, a resolution method 162 may include a self-healing method 162a or a manual healing method 162b. When the resolution method 162 mapped to the matching root cause 160 from the identified data container 150 is a self-healing method 162a, alarms manager 140 may be configured to automatically implement the self-healing method 162a to resolve the respective root cause 160 associated with the new alarm 152a. On the other hand, when the resolution method 162 mapped to the matching root cause 160 from the identified data container 150 is a manual healing method 162b, alarms manager 140 may be configured to transmit information relating to the manual healing method 162b to a designated computing node 104 which may be accessed by a support team member (e.g., a user 106) and manually implemented to resolve the respective root cause 160 associated with the new alarm 152a.

In one or more embodiments, when the alarms manager 140 identifies one or more root causes 160 associated with the new alarm 152a from a particular data container 150 storing a resolution process 156 associated with a same or similar alarm 152b that was previously resolved (e.g., as described above as the first example method), alarms manager 140 may not need to search the data containers 150 to determine resolution methods 162 corresponding to the identified root causes 160. Instead, alarms manager 140 may extract from the particular data container 150 from which a root cause 160 was identified, a resolution method 162 corresponding to the identified root cause 160 as stored in the particular data container 150.

As described above, alarms manager 140 may be configured to store in the newly generated data container 150 associated with the new alarm 152a, all operations associated with the resolution process 156 for investigating and resolving the alarm 152a. For example, alarms manager 140 may store in the newly generated data container 150, one or more identified root causes 160 and the corresponding resolution methods 162 that were implemented to resolve the root causes 160 associated with the new alarm 152a.

In one or more embodiments, alarms manager 140 may be configured to use the machine learning model 146 to search the plurality of data containers 150 for a same or a similar root cause 160 that was previously resolved with respect to a root cause 160 identified for the new alarm 152a. In this context, the machine learning model 146 may be trained (e.g., by alarms manager 140) based on data stored in the plurality of data containers 150 to determine same or similar root causes 160 associated with root causes 160 identified for the new alarm 152a and further determine a respective resolution method 162.

In certain embodiments, alarms manager 140 may be unable to determine from the data containers 150 a matching root cause 160 that is same or similar to a root cause 160 identified for the new alarm 152a. In such embodiments, alarms manager 140 may be configured to transmit a message relating to the root cause 160 identified for the new alarm 152a to a designated computing node 104, wherein the transmitted message includes information relating to the unresolved root cause 160. A support team member (e.g., a user 106) may access the information relating to the root cause from the designated computing node 104 and manually determine a resolution method 162 to resolve the root cause 160. The manually determined resolution method 162 may be designed as a self-healing method 162a not requiring human intervention. In this case, the resolution method 162 that was manually determined and applied to resolve the root cause 160 associated with the new alarm 152a is stored in the newly generated data container 150 as a self-healing method 162a mapped to the resolved root cause 160. In such a case, subsequent applications of the resolution method 162 may be applied as a self-healing method 162a without human intervention. Alternatively, the manually determined resolution method 162 may need human intervention for implementation. In this case, the resolution method 162 is stored in the newly generated data container 150 as a manual healing method 162b mapped to the resolved root cause 160.

Once the new alarm 152a has been resolved and all data associated with the resolution process 156 associated with the new alarm 152 has been store in the newly generated data container 150 associated with the new alarm 152a, alarms manager 140 may be configured to re-train the machine learning model with an updated training data set including the data stored in the newly generated data container 150.

Alarms manager 140 may be configured to implement one or more of data security, data privacy and responsiveness associated with the end-to-end resolution process 156 related to an alarm 152. In this context, alarms manager 140 may store a plurality of rules 170 defining one or more of data security, data privacy and responsiveness to be followed and applied while investigating and resolving an alarm 152. As further described below, alarms manager 140 may be configured to monitor the end-to-end resolution process 156 (e.g., as described above) associated with a new alarm 152a and apply the rules 170 to implement one or more of data security, data privacy and responsiveness of the resolution process 156.

In a first embodiment, the rules 170 may include a first set of the rules 170 defining data security for the resolution process 156 associated with the new alarm 152a. The first set of rules 170 may define that authenticity of a newly triggered alarm 152a should be validated before initiating a resolution process 156 to resolve the alarm 152a. In this context, in response to receiving a new alarm 152a indicating a malfunction and/or failure of a software application 110, alarms manager 140 may be configured to apply the first set of rules 170 by validating the authenticity of the received alarm 152a and allowing the resolution process 156 to initiate only after determining that the new alarm 152a is authentic. Validating the authenticity of new alarms 152a improves data/system security by not allowing unauthorized entities/users to trigger alarms 152a.

Alarms manager 140 may be configured to validate the authenticity of the newly received alarm 152a by identifying a source that triggered the new alarm 152a and verifying whether the identified source of the new alarm 152a is authorized to trigger the new alarm 152a. The source of the new alarm 152a may be a user 106 or an automated computing node 104 that is configured to automatically trigger a new alarm 152 in response to detecting a malfunction and/or failure of a particular software application 110. As described above, a new alarm 152a may be manually raised by a user 106 or automatically generated by a computing node 104. For example, a user 106, in response to experiencing a malfunction or failure associated with a software application 110, may manually generate an alarm 152a and transmit the alarm 152a to the alarms manager 140. The user 106 may generate and transmit the alarm 152a using one or more of several methods including, but not limited to, generating the alarm 152 using a customized application running on a computing node 104 registered with the alarms manager 140, emailing an indication of the alarm 152a to an email address designated for receiving alarms 152, transmitting a text message including an indication of the alarm 152a to a phone number designated for receiving alarms 152a, and placing a telephone call to a support team member to communicate the alarm 152a. In additional or alternative embodiments, a computing node 104 may be configured to automatically detect a malfunction and/or failure associated with a software application 110, generate an alarm 152a indicating the detecting malfunction and/or failure, and transmit the alarm 152a to a second computing node 104 configured to receive automatically generated alarms 152a.

Alarms manager 140 may be configured to store a user ID 142 associated with each user 106 registered to operate in the computing infrastructure 102. For example, alarms manager 140 may store a user ID 142 associated with each user 106 of the computing infrastructure 102 registered to access one or more software applications 110. Alarms manager 140 may further be configured to store a device ID 144 associated with each computing node 104 of the computing infrastructure 102. Additionally, alarms manager 140 may be configured to store a set of permissions 172 associated with each user ID 142, wherein a set of permissions 172 associated with a user ID 142 of a particular user 106 may indicate whether the particular user 106 is authorized to trigger new alarms 152a associated with particular software applications 110. Additionally or alternatively, alarms manager 140 may be configured to store a set of permissions 172 associated with each device ID 144, wherein a set of permissions 174 associated with a device ID 144 of a particular computing node 104 may indicate whether the particular computing node 104 is authorized to automatically trigger new alarms 152 associated with particular software applications 110.

When a new alarm 152a associated with a particular software application 110 is manually triggered by a particular user 106, alarms manager 140 may be configured to identify a user ID 142 associated with the particular user 106. The manner in which the alarms manager 140 determines the user ID 142 associated with the particular user 106 varies depending on how the particular user 106 triggered the new alarm 152a. For example, if the particular user 106 used a computing node 104 to trigger the new alarm 152a, the alarms manager 140 may prompt the particular user 106 to identify himself/herself, for example, using a username and/or password to which the user ID 142 of the particular user 106 may be associated. Additionally or alternatively, alarms manager 140 may determine the device ID 144 of the computing node 104 being used by the particular user 106 and determine the user ID of the particular user 106 that is mapped to the device ID of the user's computing node 104. If the particular user 106 reports the new alarm 152a using an email message, the particular user 106 may be asked to include information relating to the identity of the particular user 106 in the email message. Similarly, the particular user 106 may be asked to identify himself/herself when triggering the new alarm using text message or phone. Once the user ID of the particular user 106 is identified, alarms manager 140 may be configured to check the set of permissions 172 associated with the user ID and determine whether the particular user 106 is authorized to trigger a new alarm 152a associated with the particular software application 110. Alarms manager 140 may allow the resolution process 156 to initiate only upon determining that the particular user 106 is authorized to trigger a new alarm 152a associated with the particular software application 110.

When the new alarm 152a associated with a particular software application 110 is automatically triggered by a particular computing node 104, alarms manager 140 may be configured to identify the computing node 104 using a device ID 144 associated with the particular computing node 104. Once the device ID 144 is identified, alarms manager 140 may check the set of permissions 172 associated with the device ID 144 and determine whether the particular computing node 104 is authorized to trigger a new alarm 152a associated with the particular software application 110.

Alarms manager 140 may allow the resolution process 156 to initiate only upon determining that the particular computing node 104 is authorized to trigger a new alarm 152a associated with the particular software application 110.

In a second embodiment, the rules 170 may include a second set of the rules 170 defining data security for the resolution process 156 associated with the new alarm 152a. The second set of rules 170 may define that a user 106 involved in the resolution process 156 of the new alarm 152a is not provided access to data which is not associated with resolving the new alarm 152a. For example, several users 106 (e.g., support team members) may have access to the resolution process 156 and may monitor and/or make changes to the resolution process 156. The data containers 150 may include data associated with resolving alarms 152b associated with various systems and sub-systems of the computing infrastructure 102. At least a portion of these systems and sub-systems may not be related to the particular software application 110 to which the new alarm 152a relates. For example, these systems and sub-systems may include other software applications 110 and computing nodes 104 that are not associated with the particular software application 110 to which the new alarm 152a relates. In this context, alarms manager may be configured to determine one or more systems and sub-systems that are associated with the particular software application 110 to which the new alarm 152a relates. The one or more systems and sub-systems that are associated with the particular software application 110 may include, but are not limited to, software components such as one or more upstream applications, one or more downstream applications, an operating system associated with the software application 110, other supporting applications associated with the new alarm 152a, and hardware components such as one or more servers running these applications. Alarms manager 140 may then identify data stored in the one or more data containers 150 that are not associated with the one or more systems and sub-systems associated with the particular software application 110. Alarms manager 140 may be configured to block access to the identified data from the one or more data containers 150 at least when the resolution process 156 is in progress, so that users 106 involved in the resolution process 156 cannot access data from the data containers 150 that does not relate to the resolution process 156. By not allowing users 106 access to data stored in the data containers 150 relating to systems and sub-systems not related to resolving the new alarm 152a, the alarms manager 140 helps improve data security in the computing infrastructure 102.

In a third embodiment, the rules 170 may include a third set of the rules 170 defining data privacy for the resolution process 156 associated with the new alarm 152a. The second set of rules 170 may define that sensitive data stored in the data containers 150 should be masked to preserve data privacy associated with the sensitive data. For example, sensitive data may include confidential information associated with organizations, personal data of users 106, and any other piece of data that is designated as sensitive. In this context, alarms manager 140 may be configured to identify data designative as sensitive data stored in one or more data containers 150 and mask the identified sensitive data at least while the resolution process 156 is in progress.

In a fourth embodiment, the rules 170 may include a fourth set of rules 170 defining responsiveness associated with the resolution process 156. For example, the fourth set of rules 170 may define a minimum level of responsiveness that is to be associated with the resolution process 156. As described above, alarms manager 140 records an event log 158 of the resolution process 156 that includes information related to all operations performed during the resolution process 156. For example, the event log 158 may record time taken to perform each of one or more operations during the resolution process 156 including but not limited to, time taken to validate the authenticity of the new alarm 152a, time taken to generate a new data container 150 associated with the new alarm 152a, time taken to determine root causes 160, time taken to determine resolution methods 162, and time taken to implement resolution methods 162. Further, alarms manager 140 may further be configured to record any delays associated with each of these operations and effectiveness of the resolution methods 162 in resolving the respective root causes. Alarms manager 140 may be configured to analyze the information associated with one or more of the operations recorded in the event log 158 and determine a responsiveness relating to resolving the new alarm 152a based on the analysis. For example, the further set of rules 170 may define a threshold time period associated with one or more operations of the resolution process 156. Upon determining that the time taken to perform a particular operation exceeded the threshold time defined for that particular operation, alarms manager 140 may determine that the responsiveness metric associated with that particular operation has not been met. This allows the alarms manager 140 to track the responsiveness of each operation of the resolution process 156 as well as the overall responsiveness of the resolution process 156. Alarms manager 140 may be configured to generate a responsiveness report including the findings from the analysis described above, which may be used to adjust the resolution process 156 to improve responsiveness.

Figure 2:
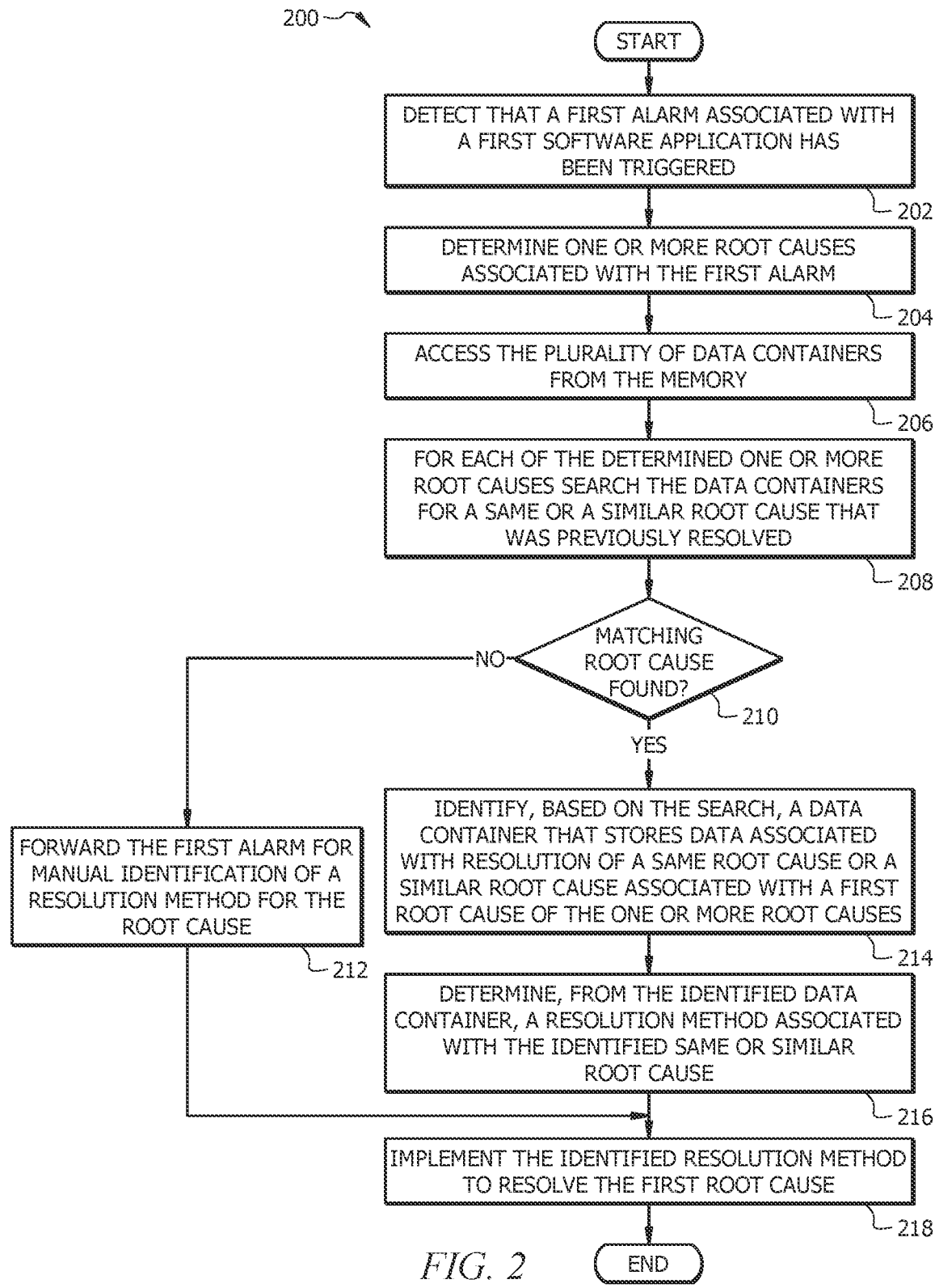
FIG. 2 illustrates a flowchart of an example method for resolving an alarm, in accordance with one or more embodiments of the present disclosure.

FIG. 2 illustrates a flowchart of an example method 200 for resolving an alarm 152a, in accordance with one or more embodiments of the present disclosure. Method 200 may be performed by the alarms manager 140 shown in FIG. 1.

At operation 202, alarms manager 140 detects that a first alarm (e.g., new alarm 152a) associated with a first software application 110 has been triggered, wherein the first alarm is indicative of an error associated with the first software application 110.

As described above, alarms manager 140 may be configured to receive alarms 152a from computing nodes 104 of the computing infrastructure 102, wherein an alarm 152 indicates an error associated with a software application 110. Alarms manager 140 may be configured to receive alarms 152a from internal systems that are part of an IT infrastructure (e.g., a first portion of the computing infrastructure 102) of an organization or external systems (e.g., a second portion of the computing infrastructure 102) that are not part of the IT infrastructure of the organization. For example, software applications 110 running on computing nodes 104 (e.g., servers) of the IT infrastructure of the organization may be used by internal systems and/or users of the organization as well as external systems and/or users that are not part of the organization. Thus, in one embodiment, when an internal system/user of the IT infrastructure experiences an error associated with a software application 110, the alarm 152a may be raised by the internal system/user. Additionally or alternatively, in one embodiment, when an external system/user that is not part of the IT infrastructure of the organization experiences an error associated with a software application 110 running on computing nodes 104 (e.g., servers) of the IT infrastructure, the alarm 152a may be raised by the external system/user. For example, an external user 106 may use an external computing node 104 (e.g., not part of the IT infrastructure) to access a web application running on a server that is part of the IT infrastructure. In this example, when the external user 106 experiences an error associated with the web application, the external user 106 may generate and alarm 152 and transmit the generated alarm 152 to the alarms manager 140. In one embodiment, the alarms manager 140 may be implemented by one or more computing nodes 104 of the portion of the computing infrastructure 102 that is part of the IT infrastructure of the organization.

In one or more embodiments, a new alarm 152a may be manually raised by a user 106 or automatically generated by a computing node 104. For example, a user 106, in response to experiencing a malfunction or failure associated with a software application, may manually generate an alarm 152a and transmit the alarm 152a to the alarms manager 140. The user 106 may generate and transmit the alarm 152a using one or more of several methods including, but not limited to, generating the alarm 152 using a customized application running on a computing node 104 registered with the alarms manager 140, emailing an indication of the alarm 152a to an email address designated for receiving alarms 152, transmitting a text message including an indication of the alarm 152a to a phone number designated for receiving alarms 152a, and placing a telephone call to a support team member to communicate the alarm 152a. In additional or alternative embodiments, a computing node 104 may be configured to automatically detect a malfunction and/or failure associated with a software application 110, generate an alarm 152a indicating the detecting malfunction and/or failure, and transmit the alarm 152a to a second computing node 104 configured to receive automatically generated alarms 152a.

Alarms manager may be configured to store a plurality of data containers 150 (e.g., 152a, 152b), wherein each data container 150 includes data associated with resolution of a particular alarm 152b that was previously received and resolved. The term "data container" in the context of the present disclosure refers to a container of data for a particular application (e.g., alarms manager 140). For example, each data container 150 may include a unique interaction code 154 that uniquely identifies a particular alarm 152 (e.g., a newly received alarm 152a or a previously resolved alarm 152b), error symptoms 155 associated with the particular alarm 152, and an associated resolution process 156. Error symptoms 155 may include errors (e.g., hung screen, user interface errors, logical errors etc.) encountered in a particular software application 110 that caused the particular alarm 152 to be triggered. In one embodiment, each of the plurality of data containers 150 is technology agnostic and is configured to be used on a plurality of technology platforms.

As shown in FIG. 1, the resolution process 156 associated with alarm 152b includes an event log 158 of all operations performed to investigate and resolve the particular alarm 152, one or more root causes 160 (e.g., shown as root causes 160a and 160b) associated with the particular alarm 152, and an error resolution method 162 (shown as self-healing method 162a and manual healing method 162b) corresponding to each root cause 160 that resolved the root cause 160. In this context, a root cause 160 is indicative of a particular error (e.g., software error or hardware error) which, at least in part, caused a software application 110 to malfunction or fail and let to the particular alarm 152 being raised. For example, a root causes 160 associated with the error symptom 155 of a hung UI screen may include faulty software code logic, insufficient allocation of memory resources, an older operating system or a combination thereof. A self-healing method 162a represents an error resolution method 162 that can be automatically applied to resolve the respective root cause 160a without human intervention. On the other hand, a manual healing method 162b represents an error resolution method 162 that needs human intervention for its application to resolve the respective root cause 160b. As further described below, alarms manager 140 may be configured to generate a new data container 150 in response to receiving an alarm 152a and may store data associated with the investigation and resolution of the alarm 152a.

In one or more embodiments, in response to detecting that an alarm 152a associated with a particular software application 110 has been triggered, alarms manager 140 may be configured to generate and assign an interaction code 154 that uniquely identifies the received alarm 152a and a corresponding resolution process 156 implemented by the alarms manager 140 to resolve the alarm 152a. Alarms manager 140 may generate a new data container 150 and may further map the generated interaction code 154 to the new data container 150. Alarms manager 140 may be configured to store information associated with the alarm 152a such as one or more error symptoms 155 associated with the particular software application 110. These error symptoms 155 may have been reported by a user 106 and/or an automated computing node 104 and may include errors (e.g., hung screen, user interface errors, logical errors etc.) encountered in the particular software application 110 that caused the alarm 152a to be triggered. As further described below, alarms manager 140 may be configured to store in the newly generated data container 150 associated with the alarm 152a, all operations associated with the resolution process 156 for investigating and resolving the alarm 152a.

At operation 204, alarms manager 140 determines one or more root causes 160 associated with the first alarm, wherein each of the one or more root causes 160 is responsible at least in part for the error associated with the first software application 110.

As described above, alarms manager 140 may be configured to perform a resolution process 156 to resolve the alarm 152a and fix one or more errors associated with the particular software application 110 that caused the alarm 152a to be triggered. The resolution process 156 may include the alarms manager 140 determining one or more root causes 160 associated with the alarm 152a, wherein each of the one or more determined root causes 160 may be responsible, at least in part, for causing the one or more errors associated with the software application 110 resulting in the malfunction or failure of the software application 110.

Alarms manager 140 may be configured to determine the one or more root causes 160 associated with the alarm 152 using one or more of several methods.

In a first example method, alarms manager 140 may be configured to search the data containers 150 for a previously resolved alarm 152b that is same as or similar to the newly received alarm 152a. For example, alarms manager 140 may search the data containers 150 for a previously resolved alarm 152 whose associated error symptoms 155 match the error symptoms 155 that were reported with the alarm 152a. For example, an error symptom 155 reported for the alarm 152a may include a hung screen associated with the particular software application 110. In this example, alarms manager 140 may search the data containers 150 for an alarm 152b that is also associated with the same error symptom 155 of a hung screen. In one embodiment, alarms manager 140 may search the data containers 150 for an alarm 152b that is also associated with the same error symptom 155 of a hung screen and also associated with the same particular software application 110 which is also associated with the newly received alarm 152a. Upon finding in a particular data container 150 a previously resolved alarm 152b that is associated with the same error symptom 155 of a hung screen, alarms manager 140 may be configured to determine that the identified previously resolved alarm 152b is same or similar to the newly received alarm 152a.

In response to determining, based on the search, a particular data container 150 associated with a previously resolved alarm 152b that is same or similar to the newly received alarm 152a, alarms manager 140 extracts from the identified particular data container 150 one or more root causes 160 associated with the previously resolved alarm 152b whose error symptoms 155 match with those of the newly received alarm 152a. Alarms manager 140 designates the extracted one or more root causes 160 as root causes 160 also associated with the newly received alarm 152a. In one embodiment, alarms manager 140 may be configured to determine that a previously resolved alarm 152b is same as the newly received alarm 152a when all error symptoms 155 associated with the previously resolved alarm 152b match the error symptoms 155 reported for the newly received alarm 152a. In an alternative or additional embodiment, alarms manager 140 may be configured to determine that a previously resolved alarm 152b is similar to the newly received alarm 152a when at least a pre-set threshold number of error symptoms 155 associated with the previously resolved alarm 152b match the corresponding error symptoms 155 reported for the newly received alarm 152a.

In one embodiment, alarms manager 140 may be configured to use a machine learning model 146 to search the data containers 150 for a previously resolved alarm 152b that is same as or similar to the newly received alarm 152a and extract one or more root causes 160 associated with the previously resolved alarm 152b. In this context, alarms manager 140 may be configured to train the machine learning model 146 based on data stored in the plurality of data containers 150.

In a second example method, alarms manager 140 may be configured to scan one or more software components (e.g., software applications 110) and/or one or more hardware components (e.g., computing nodes 104) associated with the new alarm 152a and the associated particular software application 110. Alarms manager 140 may determine one or more root causes associated with the new alarm 152a based on this scan. For example, alarms manager 140 may be configured to scan the particular software application 110, one or more upstream applications, one or more downstream applications, an operating system associated with the software application, and other supporting applications etc. associated with the new alarm 152a. Further, alarms manager 140 may be configured to scan systems and subsystems (e.g., hardware components such as one or more servers running these applications etc.) associated with the particular software application 110 to identify root causes 160 that caused the error symptoms 155 in the particular software application 110. For example, alarms manager 140 may be configured to scan/monitor a set of parameters indicating performance of the one or more software components (e.g., software applications 110) and/or one or more hardware components (e.g., computing nodes 104) associated with the new alarm 152a. When a particular parameter is found to be performing below an accepted (E.g., threshold) performance level, alarms manager 140 may be configured to determine malfunction of that particular parameter as a root cause 160 associated with the new alarm 152a.

In a third example method, upon receipt of the new alarm 152a, alarms manager 140 may be configured to automatically forward the new alarm 152a to a designated computing node 104 where an authorized support team member (e.g., one of users 106) may examine the new alarm 152 and the accompanying error symptoms 155 associated with the new alarm 152. The support team member may then manually investigate the alarm 152a and identify one or more root causes 160 associated with the new alarm 152a.

In certain embodiments, a combination of the above three methods for determining one or more root causes 160 may be performed. For example, alarms manager 140 may be configured to perform two or all three of the above described three methods to determine on or more root causes 160 associated with the new alarm 152a. In one embodiment, alarms manager 140 may forward the new alarm 152a to the support team member for manual identification of root causes 160 when either one or both of the first two methods described above fail to yield root causes 160 associated with the new alarm 152a.

At operation 206, alarms manager 140 accesses the plurality of data containers from the memory (e.g., memory 196 shown in FIG. 1).

At operation 208, for each of the determined one or more root causes, alarms manager 140 searches the data containers 150 for a same or a similar root cause that was previously resolved.

As described above, once one or more root causes 160 associated with the new alarm 152a have been determined, alarms manager 140 may be configured to search the data containers 150 for an error resolution method 162 corresponding to each of the determined one or more root causes 160. This search may include for each root cause 160 determined for the new alarm 152a, searching the data containers 150 for a same or similar root cause 160 that was previously resolved. As described above, each data container 150 stores the resolution process 156 associated with a previously resolved alarm 152b, including one or more root causes 160 (e.g., shown as root causes 160a and 160b) associated with the alarm 152b, and an error resolution method 162 (shown as self-healing method 162a and manual healing method 162b) corresponding to each root cause 160. Thus, in this context, for each root cause 160 determined for the new alarm 152a, alarms manager 140 may be configured to search the data containers 150 for a matching root cause 160 that was previously resolved. For example, a root cause 160 determined for the new alarm 152a with a reported error symptom 155 of a hung UI screen may include insufficient allocation of memory resources. In this example, alarms manager 140 may search the data containers 150 for a matching root cause 160 associated with a previously resolved alarm 152b that also corresponds to insufficient allocation of memory resources.

In one or more embodiments, when the alarms manager 140 identifies one or more root causes 160 associated with the new alarm 152a from a particular data container 150 storing a resolution process 156 associated with a same or similar alarm 152b that was previously resolved (e.g., as described above as the first example method), alarms manager 140 may not need to search the data containers 150 to determine resolution methods 162 corresponding to the identified root causes 160. Instead, alarms manager 140 may extract from the particular data container 150 from which a root cause 160 was identified, a resolution method 162 corresponding to the identified root cause 160 as stored in the particular data container 150.

At operation 210, if a matching root cause is not found in the data containers 150 for a particular root cause 160 of the one or more root causes, method 200 proceeds to operation 212 where the alarms manager 140 forwards the first alarm for manual identification of a resolution method 162 for the root cause 160. On the other hand, if a matching root cause is found in the data containers 150 for a particular root cause 160, method 200 proceeds to operation 214 where the alarms manager 140 identifies a data container 150 that stores data associated with resolution of a same root cause 160 or a similar root cause 160 associated with the particular root cause 160 of the one or more root causes 160.

At operation 216, alarms manager 140 determines from the identified data container 150, a resolution method 162 associated with the identified same or similar root cause 160.

At operation 218, alarms manager 140 implements the identified resolution method to resolve the particular root cause.

As described above, upon identifying a matching root cause 160 in a particular data container 150, alarms manager 140 may be configured to identify from the particular data container 150 a resolution method 162 mapped to the identified root cause 160 that was previously implemented to resolve the root cause 160. As described above, a resolution method 162 may include a self-healing method 162a or a manual healing method 162b. When the resolution method 162 mapped to the matching root cause 160 from the identified data container 150 is a self-healing method 162a, alarms manager 140 may be configured to automatically implement the self-healing method 162a to resolve the respective root cause 160 associated with the new alarm 152a. On the other hand, when the resolution method 162 mapped to the matching root cause 160 from the identified data container 150 is a manual healing method 162b, alarms manager 140 may be configured to transmit information relating to the manual healing method 162b to a designated computing node 104 which may be accessed by a support team member (e.g., a user 106) and manually implemented to resolve the respective root cause 160 associated with the new alarm 152a.

Figure 3:
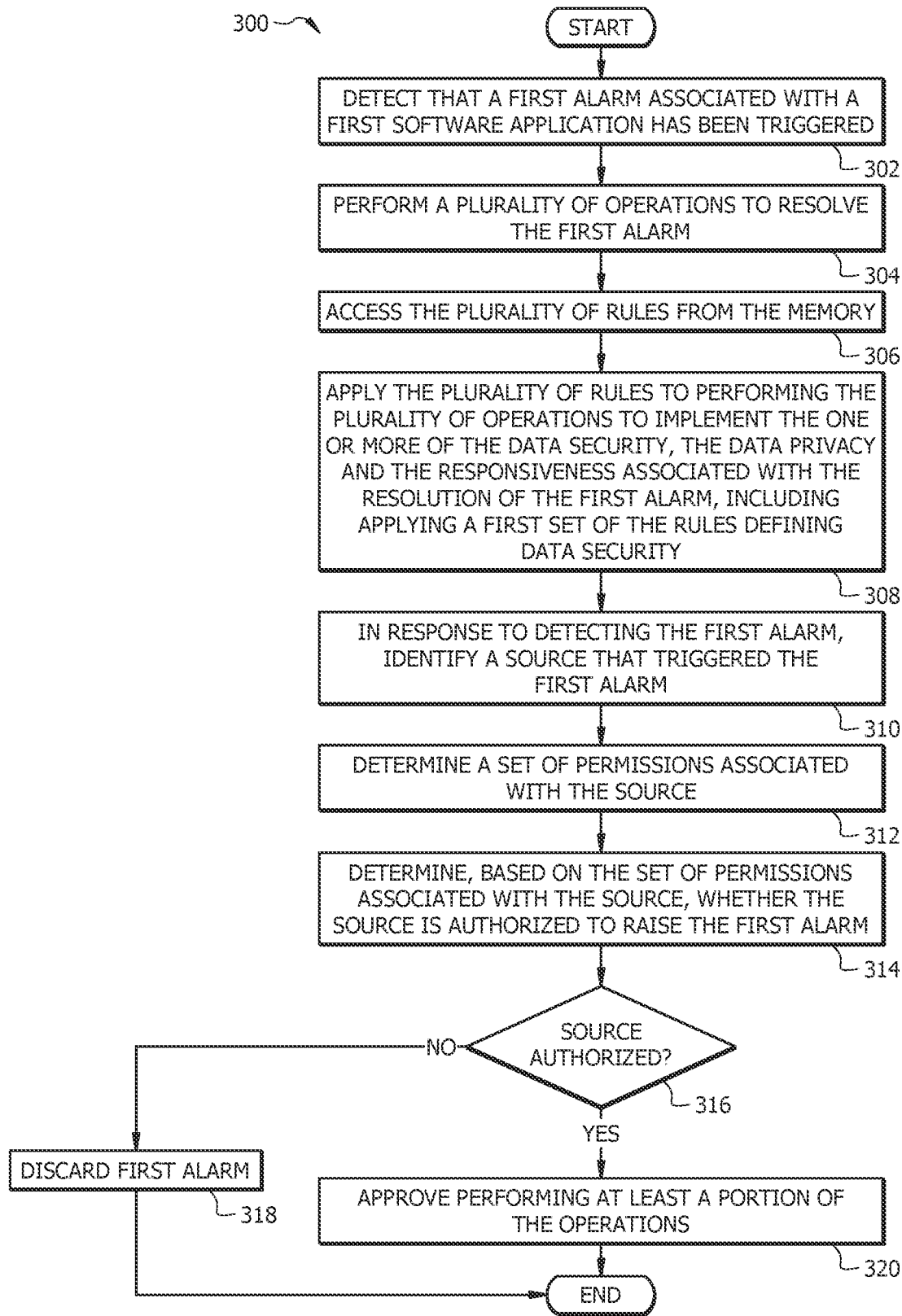
FIG. 3 illustrates a flowchart of an example method for resolving an alarm securely and responsively, in accordance with one or more embodiments of the present disclosure.

FIG. 3 illustrates a flowchart of an example method 200 for resolving an alarm 152a securely and responsively, in accordance with one or more embodiments of the present disclosure. Method 300 may be performed by the alarms manager 140 shown in FIG. 1.

At operation 302, alarms manager 140 detects that a first alarm (e.g., new alarm 152a) associated with a first software application 110 has been triggered, wherein the first alarm is indicative of an error associated with the first software application.

As described above, alarms manager 140 may be configured to receive alarms 152a from computing nodes 104 of the computing infrastructure 102, wherein an alarm 152 indicates an error associated with a software application 110. Alarms manager 140 may be configured to receive alarms 152a from internal systems that are part of an IT infrastructure (e.g., a first portion of the computing infrastructure 102) of an organization or external systems (e.g., a second portion of the computing infrastructure 102) that are not part of the IT infrastructure of the organization. For example, software applications 110 running on computing nodes 104 (e.g., servers) of the IT infrastructure of the organization may be used by internal systems and/or users of the organization as well as external systems and/or users that are not part of the organization. Thus, in one embodiment, when an internal system/user of the IT infrastructure experiences an error associated with a software application 110, the alarm 152a may be raised by the internal system/user. Additionally or alternatively, in one embodiment, when an external system/user that is not part of the IT infrastructure of the organization experiences an error associated with a software application 110 running on computing nodes 104 (e.g., servers) of the IT infrastructure, the alarm 152a may be raised by the external system/user. For example, an external user 106 may use an external computing node 104 (e.g., not part of the IT infrastructure) to access a web application running on a server that is part of the IT infrastructure. In this example, when the external user 106 experiences an error associated with the web application, the external user 106 may generate and alarm 152 and transmit the generated alarm 152 to the alarms manager 140. In one embodiment, the alarms manager 140 may be implemented by one or more computing nodes 104 of the portion of the computing infrastructure 102 that is part of the IT infrastructure of the organization.

In one or more embodiments, a new alarm 152a may be manually raised by a user 106 or automatically generated by a computing node 104. For example, a user 106, in response to experiencing a malfunction or failure associated with a software application, may manually generate an alarm 152a and transmit the alarm 152a to the alarms manager 140. The user 106 may generate and transmit the alarm 152a using one or more of several methods including, but not limited to, generating the alarm 152 using a customized application running on a computing node 104 registered with the alarms manager 140, emailing an indication of the alarm 152a to an email address designated for receiving alarms 152, transmitting a text message including an indication of the alarm 152a to a phone number designated for receiving alarms 152a, and placing a telephone call to a support team member to communicate the alarm 152a. In additional or alternative embodiments, a computing node 104 may be configured to automatically detect a malfunction and/or failure associated with a software application 110, generate an alarm 152a indicating the detecting malfunction and/or failure, and transmit the alarm 152a to a second computing node 104 configured to receive automatically generated alarms 152a.

Alarms manager may be configured to store a plurality of data containers 150 (e.g., 152a, 152b), wherein each data container 150 includes data associated with resolution of a particular alarm 152b that was previously received and resolved. The term "data container" in the context of the present disclosure refers to a container of data for a particular application (e.g., alarms manager 140). For example, each data container 150 may include a unique interaction code 154 that uniquely identifies a particular alarm 152 (e.g., a newly received alarm 152a or a previously resolved alarm 152b), error symptoms 155 associated with the particular alarm 152, and an associated resolution process 156. Error symptoms 155 may include errors (e.g., hung screen, user interface errors, logical errors etc.) encountered in a particular software application 110 that caused the particular alarm 152 to be triggered. In one embodiment, each of the plurality of data containers 150 is technology agnostic and is configured to be used on a plurality of technology platforms.

As shown in FIG. 1, the resolution process 156 associated with alarm 152b includes an event log 158 of all operations performed to investigate and resolve the particular alarm 152, one or more root causes 160 (e.g., shown as root causes 160a and 160b) associated with the particular alarm 152, and an error resolution method 162 (shown as self-healing method 162a and manual healing method 162b) corresponding to each root cause 160 that resolved the root cause 160.

In this context, a root cause 160 is indicative of a particular error (e.g., software error or hardware error) which, at least in part, caused a software application 110 to malfunction or fail and let to the particular alarm 152 being raised. For example, a root causes 160 associated with the error symptom 155 of a hung UI screen may include faulty software code logic, insufficient allocation of memory resources, an older operating system or a combination thereof. A self-healing method 162a represents an error resolution method 162 that can be automatically applied to resolve the respective root cause 160a without human intervention. On the other hand, a manual healing method 162b represents an error resolution method 162 that needs human intervention for its application to resolve the respective root cause 160b. As further described below, alarms manager 140 may be configured to generate a new data container 150 in response to receiving an alarm 152a and may store data associated with the investigation and resolution of the alarm 152a.

At operation 304, alarms manager 140 performs a plurality of operations to resolve the first alarm.

In one or more embodiments, the plurality of operations may include, generating a unique interaction code 154 that uniquely identifies the first alarm, generating a new data container 150, mapping the interaction code 154 to the new data container 150, performing a resolution process 156, and storing data associated with the plurality of operations in the new data container 150 associated with the first alarm.

As described above, in response to detecting that an alarm 152a associated with a particular software application 110 has been triggered, alarms manager 140 may be configured to generate and assign an interaction code 154 that uniquely identifies the received alarm 152a and a corresponding resolution process 156 implemented by the alarms manager 140 to resolve the alarm 152a. Alarms manager 140 may generate a new data container 150 and may further map the generated interaction code 154 to the new data container 150. Alarms manager 140 may be configured to store information associated with the alarm 152a such as one or more error symptoms 155 associated with the particular software application 110. These error symptoms 155 may have been reported by a user 106 and/or an automated computing node 104 and may include errors (e.g., hung screen, user interface errors, logical errors etc.) encountered in the particular software application 110 that caused the alarm 152a to be triggered. As further described below, alarms manager 140 may be configured to store in the newly generated data container 150 associated with the alarm 152a, all operations associated with the resolution process 156 for investigating and resolving the alarm 152a.

Alarms manager 140 may be configured to perform a resolution process 156 to resolve the alarm 152a and fix one or more errors associated with the particular software application 110 that caused the alarm 152a to be triggered. The resolution process 156 may include the alarms manager 140 determining one or more root causes 160 associated with the alarm 152a, identifying a resolution method 162 associated with each root cause and implementing the identified resolution methods to resolve the alarm 152a.

At operation 306, alarms manager 140 accesses the plurality of rules 170 from the memory (e.g., memory 196 shown in FIG. 1).

As described above, alarms manager 140 may be configured to implement one or more of data security, data privacy and responsiveness associated with the end-to-end resolution process 156 related to an alarm 152. In this context, alarms manager 140 may store a plurality of rules 170 defining one or more of data security, data privacy and responsiveness to be followed and applied while investigating and resolving an alarm 152. As further described below, alarms manager 140 may be configured to monitor the end-to-end resolution process 156 (e.g., as described above) associated with a new alarm 152a and apply the rules 170 to implement one or more of data security, data privacy and responsiveness of the resolution process 156.

At operation 308, alarms manager 140 applies the plurality of rules 170 to performing the plurality of operations to implement one or more of data security, data privacy and responsiveness associated with the resolution of the first alarm. In one embodiment, as part of applying the plurality of rules 170, alarms manager 140 applies a first set of rules defining data security for the resolution process 156 associated with the first alarm.

At operation 310, as part of applying the first set of rules defining data security for the resolution process 156 associated with the first alarm, alarms manager 140 identifies a source that triggered the first alarm.

As described above, the rules 170 may include a first set of the rules 170 defining data security for the resolution process 156 associated with the new alarm 152a. The first set of rules 170 may define that authenticity of a newly triggered alarm 152a should be validated before initiating a resolution process 156 to resolve the alarm 152a. In this context, in response to receiving a new alarm 152a indicating a malfunction and/or failure of a software application 110, alarms manager 140 may be configured to apply the first set of rules 170 by validating the authenticity of the received alarm 152a and allowing the resolution process 156 to initiate only after determining that the new alarm 152a is authentic. Validating the authenticity of new alarms 152a improves data/system security by not allowing unauthorized entities/users to trigger alarms 152a.

Alarms manager 140 may be configured to validate the authenticity of the newly received alarm 152a by identifying a source that triggered the new alarm 152a and verifying whether the identified source of the new alarm 152a is authorized to trigger the new alarm 152a. The source of the new alarm 152a may be a user 106 or an automated computing node 104 that is configured to automatically trigger a new alarm 152 in response to detecting a malfunction and/or failure of a particular software application 110. As described above, a new alarm 152a may be manually raised by a user 106 or automatically generated by a computing node 104. For example, a user 106, in response to experiencing a malfunction or failure associated with a software application 110, may manually generate an alarm 152a and transmit the alarm 152a to the alarms manager 140. The user 106 may generate and transmit the alarm 152a using one or more of several methods including, but not limited to, generating the alarm 152 using a customized application running on a computing node 104 registered with the alarms manager 140, emailing an indication of the alarm 152a to an email address designated for receiving alarms 152, transmitting a text message including an indication of the alarm 152a to a phone number designated for receiving alarms 152a, and placing a telephone call to a support team member to communicate the alarm 152a. In additional or alternative embodiments, a computing node 104 may be configured to automatically detect a malfunction and/or failure associated with a software application 110, generate an alarm 152a indicating the detecting malfunction and/or failure, and transmit the alarm 152a to a second computing node 104 configured to receive automatically generated alarms 152a.

At operation 312, alarms manager 140 determines a set of permissions 172 associated with the source of the first alarm.

As described above, alarms manager 140 may be configured to store a user ID 142 associated with each user 106 registered to operate in the computing infrastructure 102. For example, alarms manager 140 may store a user ID 142 associated with each user 106 of the computing infrastructure 102 registered to access one or more software applications 110. Alarms manager 140 may further be configured to store a device ID 144 associated with each computing node 104 of the computing infrastructure 102. Additionally, alarms manager 140 may be configured to store a set of permissions 172 associated with each user ID 142, wherein a set of permissions 172 associated with a user ID 142 of a particular user 106 may indicate whether the particular user 106 is authorized to trigger new alarms 152a associated with particular software applications 110. Additionally or alternatively, alarms manager 140 may be configured to store a set of permissions 172 associated with each device ID 144, wherein a set of permissions 174 associated with a device ID 144 of a particular computing node 104 may indicate whether the particular computing node 104 is authorized to automatically trigger new alarms 152 associated with particular software applications 110.

At operation 314, alarms manager 140 determines, based on the set of permissions 172 associated with the source, whether the source is authorized to raise the first alarm.

As described above, when a new alarm 152a associated with a particular software application 110 is manually triggered by a particular user 106, alarms manager 140 may be configured to identify a user ID 142 associated with the particular user 106. The manner in which the alarms manager 140 determines the user ID 142 associated with the particular user 106 varies depending on how the particular user 106 triggered the new alarm 152a. For example, if the particular user 106 used a computing node 104 to trigger the new alarm 152a, the alarms manager 140 may prompt the particular user 106 to identify himself/herself, for example, using a username and/or password to which the user ID 142 of the particular user 106 may be associated. Additionally or alternatively, alarms manager 140 may determine the device ID 144 of the computing node 104 being used by the particular user 106 and determine the user ID of the particular user 106 that is mapped to the device ID of the user's computing node 104. If the particular user 106 reports the new alarm 152a using an email message, the particular user 106 may be asked to include information relating to the identity of the particular user 106 in the email message. Similarly, the particular user 106 may be asked to identify himself/herself when triggering the new alarm using text message or phone. Once the user ID of the particular user 106 is identified, alarms manager 140 may be configured to check the set of permissions 172 associated with the user ID and determine whether the particular user 106 is authorized to trigger a new alarm 152a associated with the particular software application 110.

When the new alarm 152a associated with a particular software application 110 is automatically triggered by a particular computing node 104, alarms manager 140 may be configured to identify the computing node 104 using a device ID 144 associated with the particular computing node 104. Once the device ID 144 is identified, alarms manager 140 may check the set of permissions 172 associated with the device ID 144 and determine whether the particular computing node 104 is authorized to trigger a new alarm 152a associated with the particular software application 110. Alarms manager 140 may allow the resolution process 156 to initiate only upon determining that the particular computing node 104 is authorized to trigger a new alarm 152a associated with the particular software application 110.

At operation 316, if the source is found to be not authorized to trigger the first alarm, method 300 proceeds to operation 318 where the alarms manager 140 discards the first alarm. On the other hand, if the source is found to be authorized to trigger the first alarm, method 300 proceeds to operation 320 where the alarms manager 140 approves performing at least a portion of the operations associated with resolving the first alarm.

As described above, when a new alarm 152a associated with a particular software application 110 is manually triggered by a particular user 106, alarms manager 140 may allow the resolution process 156 to initiate only upon determining that the particular user 106 is authorized to trigger a new alarm 152a associated with the particular software application 110. In an additional or alternative embodiment, when the new alarm 152a associated with a particular software application 110 is automatically triggered by a particular computing node 104, alarms manager 140 may allow the resolution process 156 to initiate only upon determining that the particular computing node 104 is authorized to trigger a new alarm 152a associated with the particular software application 110.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a memory that stores a plurality of rules defining one or more of data security, data privacy and responsiveness associated with resolution of an alarm, wherein the alarm is indicative of an error associated with a software application;
a processor communicatively coupled to the memory and configured to:
detect that a first alarm associated with a first software application has been triggered, wherein the first alarm is indicative of an error associated with the first software application;

perform a plurality of operations to resolve the first alarm:

access the plurality of rules from the memory;

apply the plurality of rules to performing the plurality of operations to implement the one or more of the data security, the data privacy and the responsiveness associated with the resolution of the first alarm, wherein applying the plurality of rules comprises applying a first set of rules defining data security by:

in response to detecting the first alarm, identifying a source that triggered the first alarm, wherein the source comprises a user or an automated computing device:

determining a set of permissions associated with the source; and determining, based on the set of permissions associated with the source, whether the source is authorized to raise the first alarm;

wherein performing at least a portion of the plurality of operations is in response to determining that the source is authorized to raise the first alarm.

2. The system of claim 1, wherein the processor is further configured to:

when the source comprises the user, receive the first alarm from the user via one or more of a phone call, a text message, or an email communication; and when the source comprises the automated computing device, receive the first alarm from the automated computing device, wherein the first alarm is automatically generated by the automated computing device.

3. The system of claim 1, wherein the processor is further configured to apply a second set of the rules defining the data security by:

determining one or more sub-systems associated with the first alarm;

identifying data stored in one or more data containers that are not associated with the one or more sub-systems; and blocking access to the identified data from the one or more data containers while the plurality of operations are being performed.

4. The system of claim 1, wherein the processor is further configured to apply a second set of the rules defining the data privacy by:

identifying sensitive data stored in one or more data containers accessible while performing the plurality of operations; and masking the identified sensitive data while the plurality of operations are being performed.

5. The system of claim 1, wherein the processor is further configured to apply a second set of the rules defining the responsiveness by:

generating a process log of the plurality of operations, wherein the process log comprises one or more of a record of each of the plurality of operations, time taken to perform one or more of the operations, delays associated with performing one or more of the operations or data related to effectiveness of a self-healing method to resolve a first root cause.

6. The system of claim 5, wherein the processor is further configured to:

analyze the process log; and determine a responsiveness relating to resolving the first alarm based on analyzing the process log.

7. The system of claim 1, wherein the plurality of operations comprise:

determining one or more root causes associated with the first alarm, wherein each of the one or more root causes is responsible at least in part for the error associated with the first software application;

accessing a plurality of data containers stored in the memory, wherein each data container comprises data associated with resolution of an alarm that was previously resolved, wherein the alarm is indicative of an error associated with a software application;

for each of the determined one or more root causes, searching the data containers for a same or a similar root cause that was previously resolved;

identifying, based on the search, a data container that stores data associated with resolution of a same root cause or a similar root cause associated with a first root cause of the one or more root causes;

determining, from the identified data container, a self-healing method associated with the identified same or similar root cause; and implementing the identified self-healing method to resolve the first root cause.

8. The system of claim 7, wherein each of the plurality of data containers is configured to be used on a plurality of technology platforms.

9. A method for resolving an alarm comprising:

detect that a first alarm associated with a first software application has been triggered, wherein the first alarm is indicative of an error associated with the first software application;

perform a plurality of operations to resolve the first alarm;

access a plurality of rules defining one or more of data security, data privacy and responsiveness associated with resolution of the first alarm;

apply the plurality of rules to performing the plurality of operations to implement the one or more of the data security, the data privacy and the responsiveness associated with the resolution of the first alarm, wherein applying the plurality of rules comprises applying a first set of rules defining data security by:

in response to detecting the first alarm, identifying a source that triggered the first alarm, wherein the source comprises a user or an automated computing device;

determining a set of permissions associated with the source; and determining, based on the set of permissions associated with the source, whether the source is authorized to raise the first alarm;

wherein performing at least a portion of the plurality of operations is in response to determining that the source is authorized to raise the first alarm.

10. The method of claim 9, further comprising:

when the source comprises the user, receiving the first alarm from the user via one or more of a phone call, a text message, or an email communication; and when the source comprises the automated computing device, receiving the first alarm from the automated computing device, wherein the first alarm is automatically generated by the automated computing device.

11. The method of claim 9, wherein applying a second set of the rules defining the data security comprises:

determining one or more sub-systems associated with the first alarm;

identifying data stored in one or more data containers that are not associated with the one or more sub-systems; and blocking access to the identified data from the one or more data containers while the plurality of operations are being performed.

12. The method of claim 9, wherein applying a second set of the rules defining the data privacy comprises:
identifying sensitive data stored in one or more data containers accessible while performing the plurality of operations; and
masking the identified sensitive data while the plurality of operations are being performed.

13. The method of claim 9, wherein applying a second set of the rules defining the responsiveness comprises:
generating a process log of the plurality of operations, wherein the process log comprises one or more of a record of each of the plurality of operations, time taken to perform one or more of the operations, delays associated with performing one or more of the operations or data related to effectiveness of a self-healing method to resolve a first root cause.

14. The method of claim 13, further comprising:
analyzing the process log; and
determining a responsiveness relating to resolving the first alarm based on analyzing the process log.

15. A non-transitory computer-readable medium storing instructions that when executed by a processor cause the processor to:
detect that a first alarm associated with a first software application has been triggered, wherein the first alarm is indicative of an error associated with the first software application;
perform a plurality of operations to resolve the first alarm;
access a plurality of rules defining one or more of data security, data privacy and responsiveness associated with resolution of the first alarm;
apply the plurality of rules to performing the plurality of operations to implement the one or more of the data security, the data privacy and the responsiveness associated with the resolution of the first alarm, wherein applying the plurality of rules comprises applying a first set of rules defining data security by:
in response to detecting the first alarm, identifying a source that triggered the first alarm, wherein the source comprises a user or an automated computing device;
determining a set of permissions associated with the source; and
determining, based on the set of permissions associated with the source,
whether the source is authorized to raise the first alarm;
wherein performing at least a portion of the plurality of operations is in response to determining that the source is authorized to raise the first alarm.

16. The non-transitory computer-readable medium of claim 15, wherein the instructions further cause the processor to:
when the source comprises the user, receive the first alarm from the user via one or more of a phone call, a text message, or an email communication; and
when the source comprises the automated computing device, receive the first alarm from the automated computing device, wherein the first alarm is automatically generated by the automated computing device.

17. The non-transitory computer-readable medium of claim 15, wherein the instructions further cause the processor to apply a second set of the rules defining the data security by:
determining one or more sub-systems associated with the first alarm;
identifying data stored in one or more data containers that are not associated with the one or more sub-systems; and
blocking access to the identified data from the one or more data containers while the plurality of operations are being performed.

18. The non-transitory computer-readable medium of claim 15, wherein the instructions further cause the processor to apply a second set of the rules defining the data privacy by:
identifying sensitive data stored in one or more data containers accessible while performing the plurality of operations; and
masking the identified sensitive data while the plurality of operations are being performed.

19. The non-transitory computer-readable medium of claim 15, wherein the instructions further cause the processor to apply a second set of rules defining the responsiveness by:
generating a process log of the plurality of operations, wherein the process log comprises one or more of a record of each of the plurality of operations, time taken to perform one or more of the operations, delays associated with performing one or more of the operations or data related to effectiveness of a self-healing method to resolve a first root cause.

20. The non-transitory computer-readable medium of claim 19, wherein the instructions further cause the processor to:
analyze the process log; and
determine a responsiveness relating to resolving the first alarm based on analyzing the process log.

* * * * *